(12) United States Patent
King, Jr. et al.

(10) Patent No.: US 9,869,797 B2
(45) Date of Patent: Jan. 16, 2018

(54) METHOD FOR PREDICTING OCCURRENCE OF MICROQUARTZ IN A BASIN

(71) Applicants: Hubert E. King, Jr., Flemington, NJ (US); Stephen D. Cameron, Milford, NJ (US); Marsha W. French, Estes Park, CO (US)

(72) Inventors: Hubert E. King, Jr., Flemington, NJ (US); Stephen D. Cameron, Milford, NJ (US); Marsha W. French, Estes Park, CO (US)

(73) Assignee: ExxonMobil Upstream Research Company, Spring, TX (US)

( * ) Notice: Subject to any disclaimer, the term of this patent is extended or adjusted under 35 U.S.C. 154(b) by 809 days.

(21) Appl. No.: 14/446,110

(22) Filed: Jul. 29, 2014

(65) Prior Publication Data

US 2015/0057986 A1 Feb. 26, 2015

Related U.S. Application Data

(60) Provisional application No. 61/869,391, filed on Aug. 23, 2013.

(51) Int. Cl.
  *G06F 7/60* (2006.01)
  *G06F 17/10* (2006.01)
  *G01V 99/00* (2009.01)
(52) U.S. Cl.
  CPC .................................. *G01V 99/005* (2013.01)
(58) Field of Classification Search
  CPC .................................................... G01V 99/005
  USPC .............................................................. 703/2
  See application file for complete search history.

(56) References Cited

U.S. PATENT DOCUMENTS

| | | |
|---|---|---|
| 4,311,683 A | 1/1982 | Hass et al. |
| 4,517,461 A | 5/1985 | Crandall |
| 5,012,052 A | 4/1991 | Hayes |
| 5,087,815 A | 2/1992 | Schultz et al. |
| 6,140,643 A | 10/2000 | Brown et al. |
| 7,435,597 B2 | 10/2008 | Mango |

(Continued)

FOREIGN PATENT DOCUMENTS

WO  2011/136858  11/2011

OTHER PUBLICATIONS

Aase, N.E., et al., (1996), "The effect of Grain-Coating Microquartz on Preservation of Reservoir Porosity", *AAPG Bulletin*, 80, pp. 1654-1673.

(Continued)

*Primary Examiner* — Timothy A Mudrick
(74) *Attorney, Agent, or Firm* — ExxonMobil Upstream Research Company—Law Department

(57) ABSTRACT

A method, including: obtaining a grain size for amorphous silica associated with a basin and a grain size for quartz associated with the basin; obtaining kinetics of silica dissolution corresponding to the basin and quartz precipitation corresponding to the basin; determining, with a processor, a concentration of amorphous silica in water based on the grain size for amorphous silica, the grain size for quartz, and the kinetics of silica dissolution and quartz precipitation; comparing, with the processor, the concentration of amorphous silica in water to an amorphous silica saturation condition; and determining, with the processor, a presence of microquartz based on a result of the comparing.

17 Claims, 5 Drawing Sheets

(56) References Cited

U.S. PATENT DOCUMENTS

| | | |
|---|---|---|
| 7,458,257 B2 | 12/2008 | Pop et al. |
| 7,752,906 B2 | 7/2010 | Pop et al. |
| 7,753,618 B2 | 7/2010 | Constantz et al. |
| 7,754,169 B2 | 7/2010 | Constantz et al. |
| 7,790,012 B2 | 9/2010 | Kirk et al. |
| 7,825,659 B2 | 11/2010 | Georgi et al. |
| 7,914,685 B2 | 3/2011 | Constantz et al. |
| 7,939,336 B2 | 5/2011 | Constantz et al. |
| 8,056,408 B2 | 11/2011 | Pop et al. |
| 8,195,399 B2 | 6/2012 | Gladkikh et al. |
| 2005/0250209 A1 | 11/2005 | Mango |
| 2007/0203677 A1* | 8/2007 | Awwiller .............. G01V 11/00 703/1 |
| 2009/0012746 A1* | 1/2009 | Kairo .................. G01V 99/00 702/181 |
| 2010/0198638 A1* | 8/2010 | Deffenbaugh ......... G01V 11/00 705/308 |
| 2011/0036728 A1 | 2/2011 | Farsad |

OTHER PUBLICATIONS

Dove, P., (1994), "The Dissolution Kinetics of Quartz in Sodium Chloride Solutions at 25 to 300C", *American Journal of Science*, 294, pp. 665-712.

Haddad, S.C., et al., (2006), "Quartz cement in the Fontainebleau sandstone, Paris basin, France: Crystallography and implications for mechanisms of cement growth", *Journal of Sedminetary Research*, 76, pp. 244-256.

Heald, M.T., et al., (1996), "Experimental study of sandstone cementation", *Journal of Sedminetary Research*, 36, pp. 977-991.

Icenhower, J.P., et al., (2000), "The dissolution kinetics of amorphous silica into sodium chloride solutions: effects of temperature and ionic strength", *Geochimica et Cosmpochimica Acta*, 64, pp. 4193-4203.

Lander, R.H., et al., (1999), "Predicting Porosity through Simulating Sandstone Compaction and Quartz Cementation", *AAPG Bulletin*, 83, pp. 433-449.

Lynne, B.Y., et al., (2005), "Diagenesis of 1900-year-old siliceous sinter (Opal-A to quartz) at Opal Mound, Roosevelt Hot Springs, Utah, U.S.A.", *Sedimentary Geology*, 179, pp. 249-278.

Rimstidt, J.D., et al., (1980), "The kinetics of silica-water reactions", *Geochimica et Cosmpochimica Acta*, 44, pp. 1683-1699.

Schnik, D.R., et al., (1975), "Process Affecting the Concentration of Silica at the Sediment-Water Interface of the Atlantic Ocean", *Journal of Geophysical Research* 80(21), pp. 3013-3031.

Worden, R.H., et al., (2012), "Amorphous silica nanofilms result in growth of misoriented microcrystalline quartz cement maintaining porosity in deeply buried sandstones", *Geology*, 40(2), pp. 179-182.

* cited by examiner

METHOD FOR PREDICTING OCCURRENCE OF MICROQUARTZ IN A BASIN

CROSS-REFERENCE TO RELATED APPLICATION

This application claims the benefit of U.S. Provisional Patent Application 61/869,391 filed Aug. 23, 2013 entitled METHOD FOR PREDICTING OCCURRENCE OF MICROQUARTZ IN A BASIN, the entirety of which is incorporated by reference herein.

FIELD OF THE INVENTION

Examples of the present technological advancement described herein pertain to modeling reservoir quality. More specifically, examples of the present technological advancement described herein can model reservoir quality by predicting the occurrence of microquartz.

BACKGROUND

This section is intended to introduce various aspects of the art, which may be associated with examples discussed in the Detailed Description section. This discussion is believed to assist in providing a framework to facilitate a better understanding of particular aspects of those examples discussed in the Detailed Description section. Accordingly, it should be understood that this section should be read in this light, and not necessarily as admissions of prior art.

Reservoir Quality (RQ), as applied to oil and gas reservoirs, is a measure of the porosity and permeability. For clastic reservoirs, mainly consisting of quartz grains, a significant loss of RQ can occur as the rock matures under the conditions of deep burial and elevated temperature. The loss of RQ is identified with the growth of quartz overgrowths under deep burial and elevated temperature.

The occurrence of micron-sized quartz coatings on the original quartz grains can inhibit further quartz growth and prevent the reduction of RQ. These thin coatings are referred to as microquartz grain coatings. Microquartz grain coatings can be identified through examination of rock cores with an optical or electron microscope. Regions with microquartz grain coatings are high RQ zones and geologic mapping can be used to estimate their extent. "High," when used to characterize RQ zones, is a relative characterization. The context of various factors, discussed further below, provide the needed context.

When high RQ is encountered and there is reason to expect that quartz cements should have blocked the pore space, for example deep burial, an examination of the rocks is undertaken. First, using an optical microscope, the clastic grains are examined for grain coats, with microquartz coats a frequent type. Abundant microquartz grain coats are associated with high RQ. If the optical examination fails to identify such coats, the samples are examined at higher magnification using electron microscopy. However, to extend this finding throughout the reservoir requires examination of many hundreds of samples from cores. Both vertical and horizontal RQ variation is needed. Finally, construction of a map that defines the boundaries of the high RQ zones is also needed.

In some deep, hot reservoirs, the burial history can be used along with a quartz growth model to predict the expected amount of quartz cementation, and therefore RQ loss. Cementation is the hardening and welding of clastic sediments (e.g., quartz) (those formed from preexisting rock fragments) by the precipitation of mineral matter in the pore spaces. If sample logs indicate higher RQ, then it is assumed that some mechanism has preserved this porosity. However, models that can relate these observations to reservoir distributions require subsequent optical and electron microscopy examination of the samples identical to that for the previous approach. This creates the need for drilling wells to supply the necessary rock samples.

SUMMARY

An exemplary method includes: obtaining a grain size for amorphous silica associated with a basin and a grain size for quartz associated with the basin; obtaining kinetics of silica dissolution corresponding to the basin and quartz precipitation corresponding to the basin; determining, with a processor, a concentration of amorphous silica in water based on the grain size for amorphous silica, the grain size for quartz, and the kinetics of silica dissolution and quartz precipitation; comparing, with the processor, the concentration of amorphous silica in water to an amorphous silica saturation condition; and determining, with the processor, a presence of microquartz based on a result of the comparing.

The exemplary method can further include: obtaining a burial rate for at least a portion of the basin, the burial rate providing a heat flow model, wherein the kinetics are dependent on temperature from the heat flow model.

In an exemplary method, the grain size for amorphous silica, the grain size for quartz, the kinetics of silica dissolution and quartz precipitation, and the burial rate are derived from a geologic setting of the basin.

In an exemplary method, the comparing includes determining a difference between the concentration of amorphous silica in water and amorphous silica saturation condition, and the determining the presence of microquartz includes comparing the difference to a predetermined threshold.

In an exemplary method, the presence of microquartz is determined in response to the difference being above the predetermined threshold.

In an exemplary method, the predetermined threshold is at or above 0.5 times the amorphous silica saturation condition.

An exemplary method can further include: obtaining an equilibrium constant for the amorphous silica in water, wherein the equilibrium constant for the amorphous silica in water is additionally used in the determining the concentration of amorphous silica in water.

In an exemplary method, the amorphous silica is biogenic silica.

An exemplary method can further include: obtaining a plurality of grain sizes for amorphous silica, each of the plurality of grain sizes being associated with a probability of occurring in the basin; and determining a probability of a presence of microquartz corresponding to each of the plurality of grain sizes.

An exemplary method can further include: obtaining a plurality of burial rates, each of the burial rates being associated with a probability of occurring in the basin; and determining a probability of a presence of microquartz corresponding to each of the plurality of burial rates.

An exemplary method can further include: obtaining identification of a plurality of silica sources, each of the plurality of silica sources being associated with a probability of occurring in the basin; and determining a probability of a presence of microquartz corresponding to each of the plurality of silica sources.

In an exemplary method, the plurality of silica sources includes amorphous silica sources, such as colloidal silica, diatoms, or silica sponge.

An exemplary method can further include: obtaining a seismic data volume representing a subsurface region of a zone of the basin determined to include microquartz; obtaining a prediction of the potential for hydrocarbon accumulations in the subsurface; and in response to a positive prediction of hydrocarbon potential, drilling a well into the subsurface region corresponding to the zone of the basin determined to comprise microquartz, and producing hydrocarbons.

Another exemplary method includes: obtaining a grain size for silica associated with a basin and a grain size for quartz associated with the basin; obtaining kinetics of silica dissolution corresponding to the basin and quartz precipitation corresponding to the basin; determining, with a processor, a concentration of silica in water based on the grain size for silica, the grain size for quartz, and kinetics of silica dissolution and quartz precipitation; and determining, with the processor, a presence of microquartz based on the concentration of silica in water.

Another exemplary method includes: obtaining, for a basin with zones that have each undergone a different thermal history, a corresponding plurality of burial rates; and determining, with a processor, a relative likelihood that each of the zones includes microquartz based on the corresponding plurality of burial rates.

BRIEF DESCRIPTION OF THE DRAWINGS

While the present disclosure is susceptible to various modifications and alternative forms, specific examples thereof have been shown in the drawings and are herein described in detail. It should be understood, however, that the description herein of specific examples, is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of the technological advancement. Moreover, certain dimensions may be exaggerated to help visually convey such principles.

DETAILED DESCRIPTION

Figure 1:
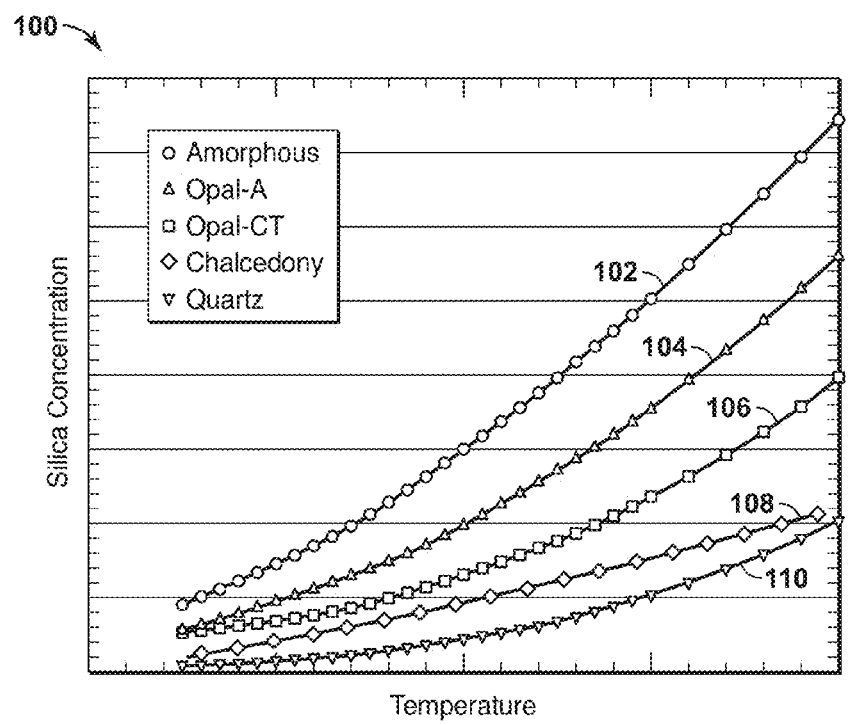
FIG. 1 illustrates concentration vs. temperature for silica sources.

Examples of the present technological advancement are described herein. The preceding description is not meant to limit the scope of the invention. Rather, the scope of the invention is to be determined only by the appended claims and their equivalents.

Examples of the present technological advancement described herein relate to a predictive model that can identify zones within a basin having microquartz coatings based upon the rock's geologic history or setting. The geologic history includes a sequence of geologic events that have taken place in a region. The geologic setting includes the geologic, hydrologic, and geochemical systems of the region.

The present model can be used with different types of basins. Examples of different types of basins include, but are not limited to, active sedimentary basins (i.e., still accumulating sediments), inactive sedimentary basins (showing original shape and sedimentary fill), strongly deformed and incomplete former sedimentary basins (original fill has been partly lost to erosion), rift-related basins, passive margin basin, ocean sag basins or nascent ocean basins, subduction-related basins, collision related basins, foreland basin, transform-fault basins, strike-slip and wrench basin, or continental or interior sag basins.

A predictive model receives initial data and predicts the behaviour of a complex physical system, such as a geologic system, based on the interaction of scientific principles on physical objects represented by the initial data. An example of the present technological advancement may utilize a method that calculates the pore water composition as a function of time combined with the time-temperature from a burial rate model, and predict where and when microquartz coatings occur and therefore identify zones with high RQ. A factor that determines whether RQ is "high" is the relative relationship between the concentration of silica in pore water and the equilibrium constant for amorphous silica in water. "High" occurs when the concentration of silica is at or above a predetermined percentage of the equilibrium constant. An exemplary value for such a percentage is discussed in more detail below. Such a predictive model will allow the evaluation of RQ potential prior to examination of drilled cores, making this a significant advantage in evaluating reservoirs when compared to conventional techniques. Identifying scenarios when the process of quartz overgrowth is suppressed or prevented can offer a significant advantage in finding high-value oil and gas resources.

Microquartz

A previous study, (Aase et al., 1996) describes microquartz coatings for a North Sea hydrocarbon reservoir. In zones where microquartz is present, the porosity is significantly enhanced (by 15-20%). Subsequent examination of microquartz coatings from this and many other settings shows that microquartz may be differentiated from ordinary quartz overgrowths through examination of the structure of the layers. The microquartz layers are characterized by crystal orientations that are not inherited from the underlying grain, unlike overgrowths that grow approximately perpendicular to the detrital quartz surface. Microquartz is much more random, with an occasional tendency to align its rapid growth direction parallel to the detrital quartz surface. A second feature is a disordered zone, lacking any definitive crystal structure (Haddad et al., 2006) and (Worden et al., 2012).

The presence of this disordered silica and the orientation of the crystals suggests that the microquartz layer is created under conditions that promote deposition of unstable forms of silica such as amorphous or opaline silica. Conditions associated with the formation of such materials are high concentrations of silica in the depositing water.

Formation of Microquartz

There are numerous silica solids that can form under reservoir conditions; these include, but are not limited to, amorphous silica, Opal-A, Opal-CT, chalcedony, and quartz. A microquartz layer can be composed of one or a mixture of several (or all) of these silica solids. Deposition of microquartz can occur from a highly-concentrated silica containing water. As shown in the graph 100 of FIG. 1, the solubility curves 102, 104, 106, 108 and 110 define the minimum concentration to precipitate a given phase. These results are based on thermodynamic stability and can be calculated by a person having ordinary skill in the art. However, the kinetics of precipitation and sequence of phases (i.e. Ostwald's Step Rule; it is not the most stable but the least stable polymorph that crystallizes first), also follow this order. For example, at any given temperature we can expect to see a sequence such as amorphous silica→Opal-A→Opal-CT→Chalcedony→Quartz. Natural hot springs are an example where highly-concentrated silica in solution precipitates according to such a sequence (Lynne et al., 2005).

The formation of such microquartz coatings is associated with deposition from highly concentrated silica solutions. Laboratory experiments confirm that microquartz coatings, similar in structure to natural ones, form and that these coatings inhibit quartz overgrowths. Therefore, similar conditions in nature result in microquartz formation.

Predictive Model for Microquartz Occurrence

Evidence from nature and the laboratory agree that the conditions necessary to produce microquartz are those of highly elevated silica concentration in water. Furthermore, Ostwald's step rule and experimental data suggest that the required concentration is approximately that of amorphous silica saturation. Therefore, the required concentration can be calculated.

The saturation index for the production of microquartz is as follows:

$$\Omega_{sat}^{amorphous} = \frac{\text{CSiO}_2\_\text{fluid}}{K^{amorphous}} = 1 \tag{1}$$

CSiO2_fluid is the silica concentration in water. $K^{amorphous}$ is the equilibrium constant for amorphous silica in water. Because $K^{amorphous}$ is dependent upon thermodynamic quantities such as temperature, the actual concentration may vary widely. However, whatever those conditions, if sufficient amorphous solid is present, then the pore water will attain the required concentration for microquartz formation.

Because quartz precipitation extracts silica from the pore water, the conditions that lead to microquartz formation occur in nature under specific conditions. The present technological advancement provides a method defining those conditions.

Quartz formation occurs whenever silica concentration exceeds its saturation concentration. The silica concentration, CSiO2_fluid, defined by quartz saturation is as follows:

$$\Omega_{sat}^{quartz} = \frac{\text{CSiO}_2\_\text{fluid}}{K^{quartz}} = 1 \tag{2}$$

$K^{quartz}$ is the equilibrium constant for quartz in water. Comparing the two inputs to CSiO2_fluid, amorphous dissolution and quartz precipitation, a condition for microquartz formation is when CSiO2_fluid becomes elevated by kinetics, such as rapid dissolution of an amorphous silica component.

The following a pair of coupled equations describe the evolution of silica concentration in the fluid with time, t:

$$\frac{d\text{CSiO}_2\_\text{fluid}}{dt} = A^{amorphous} \times k_+^{amorphous}(1 - \Omega^{amorphous}) \tag{3}$$

$$\frac{d\text{CSiO}_2\_\text{fluid}}{dt} = A^{quartz} \times k_+^{quartz}(1 - \Omega^{quartz}) \tag{4}$$

Here, the surface area, A, and the kinetics of dissolution/precipitation, k+, of each phase will be important, as well as the equilibrium constant, K. Both k+ and K are dependent on physical conditions such as temperature, salinity, and pH. In most situations, the salinity and pH will be buffered by the surrounding rocks; hence focus shifts to temperature.

Based on geologic reasoning, the following situation leads to microquartz formation. First, a highly-soluble, amorphous-like silica source is deposited along with the quartz grains. This could be a biogenic silica, such as diatoms or sponge spicules. Second, this assemblage is buried, causing the sediment temperature to rise in a manner commensurate with burial rate and the local geothermal gradient. Microquartz will be formed when the above coupled equations allow CSiO2 fluid to rise up to values near $K^{amorphous}$. Near is a relative term that depends upon the factors of particular situations, and is further characterized below.

The following illustrates a model in which a solution for the coupled equations produces the following equation:

$$C(t) = e^{\alpha t}(\text{Cinitial} - \beta/\alpha) + \beta/\alpha, \tag{5}$$

where the following terms are defined as:
C(t) is the concentration of amorphous silica as a function of time t, Cinitial is an initial concentration of the amorphous silica in water, $$\alpha = \frac{k_+^{amorphous} A^{amorphous}}{K^{amorphous}} + \frac{k_+^{quartz} A^{quartz}}{K^{quartz}}, \text{ and} \tag{6}$$

$$\beta = k_+^{amorphous} A^{amorphous} + k_+^{quartz} A^{quartz}. \tag{7}$$

Figures 3, 4:
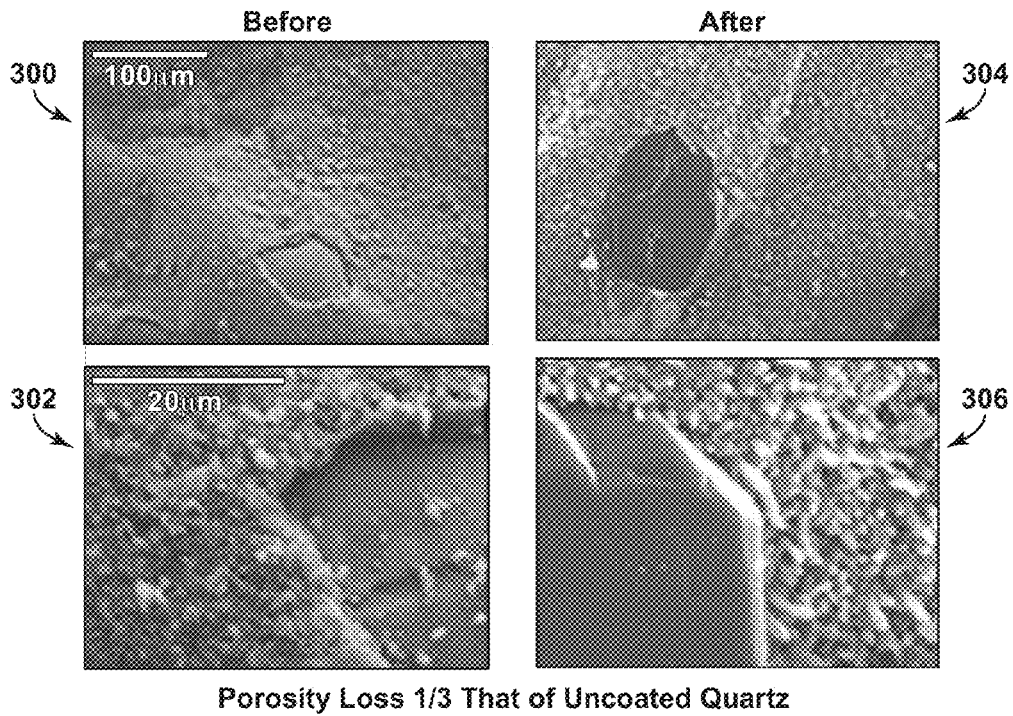
FIG. 3 illustrates laboratory grown microquartz inhibiting growth of quartz overgrowths.
FIG. 4 is a table indicating conditions conductive to microquartz formation.

If C(t) is near to amorphous silica saturation conditions then the conditions for microquartz formation are achieved. FIG. 4 provides an example of Amorphous Saturation=2200 ppm, C(t) (no microquartz)=1000 ppm, R=0.45, where R is a ratio of C(t) to the Amorphous Saturation. Thus, for purposes of illustration, the term "near" may refer to C(t) being at least 50% of the amorphous silica saturation condition. However, depending on parameters of a given project, this predetermined threshold may be adjusted in order to achieve desired goals, such as identifying zones in a basin with a higher probability of including microquartz. The threshold may be set at any value from 50% and up, and all values within this range are part of the present disclosure.

Accordingly, through an understanding of the structure and formation conditions for microquartz, a predictive model is created for the occurrence of microquartz in nature. Microquartz is a proven indicator of RQ for deeply buried clastic reservoirs, thus the model can be a highly important tool in identifying potential areas with high RQ for exploration.

For a restricted set of geologic conditions, all of which can be derived from the geologic setting, this calculation (equation 5) can provide a predictor for the formation of microquartz. If desired, the algorithm can be run for many scenarios, each with an estimated probability, to produce a statistical measure of the probability of finding microquartz in a given setting. This information would allow an estimate for the probability of high RQ, without the need to drill and sample the rocks, a significant improvement over current practice.

Demonstration of Microquartz Formation for Silica Concentration Near Amorphous Saturation A laboratory experiment has demonstrated the formation of microquartz for silica concentration near amorphous saturation. Clean quartz grains were placed in small batch reactors along with a source of silica. Solid silica sources that dissolve in the surrounding water were tested, including those that produce high-silica concentrations and those that did not. Pre-mixed solutions at selected silica concentrations were also tested. The laboratory experiments were conducted at elevated temperatures and with a high pH aqueous solution to accelerate the reactions. These results relate to natural conditions through a calculation of the amorphous silica saturation under these conditions.

Figure 2:
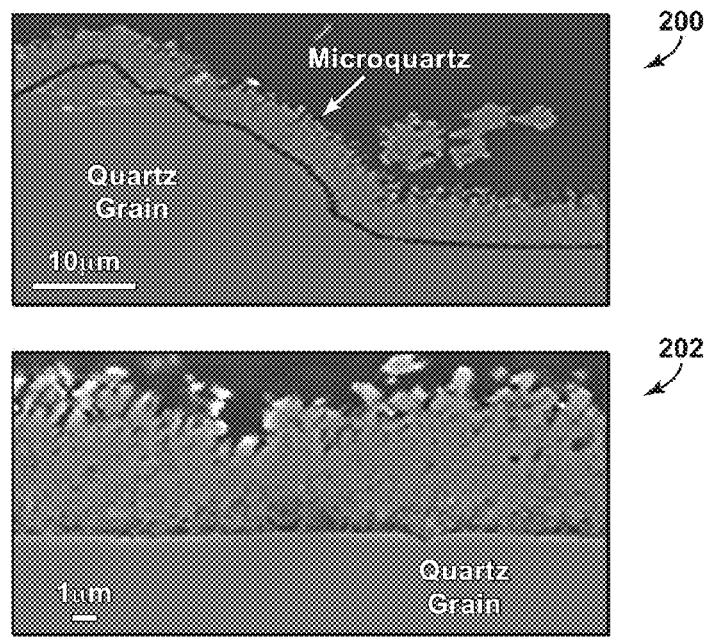
FIG. 2 illustrates laboratory grown microquartz coating.

After a few days of reactions, a microquartz coating was formed. FIG. 2 shows a SEM (scanning electron microscope) images 200 and 202 of the cross-section of a laboratory-produced microquartz coating. The image 200 is at a 10 micrometer (μm) scale, while the image 202 is at a 1 μm scale. Diffraction studies of this microquartz show regions with a disorder, like natural materials.

The laboratory grown microquartz grain coatings inhibited quartz overgrowth, like the natural microquartz grain coatings. Subjecting the microquartz coated grains to conditions of quartz growth, resulted in very little change. This contrasts sharply with the effects on un-coated quartz grains, where significant overgrowths occur. After seven days, each type of quartz grain was analyzed using the SEM to document the changes, see FIG. 3. The image 300 is of an initial micro quartz grain coating at a 100 micrometer (μm) scale, while the image 302 of the initial micro quartz grain coating at a 20 μm scale. The image 304 is of the micro quartz grain coating at a 100 micrometer (μm) scale after seven days, while the image 306 of the micro quartz grain coating at a 20 μm scale after seven days. Note the absence of quartz growth across the grain surface, which is coated with micro quartz. At the left side of image 306 a small uncoated region is shown, demonstrating the overgrowth formation there. We so, also verified, through weighting the grains before and after, that there was minimal weight gain. By both measures, the microquartz coating was effective at preventing quartz overgrowths.

The laboratory experiment demonstrates the following:
1. In both structure and function, i.e. quartz overgrowth inhibition, laboratory microquartz coatings are equivalent to those in nature. Therefore conclusions regarding their formation conditions are transferable; and
2. Microquartz coatings form at silica concentrations near to those for amorphous silica saturation and do not form at lower concentrations (see FIG. 4).

FIG. 4 shows test results that confirm microquartz coatings are formed on quartz grains under conditions where the concentration is at or above that of saturation for amorphous silica. In this FIG. 4, the silica source is shown in column 402, the microquartz is shown in column 404 and the key concentration is approximately amorphous saturation is shown in column 406. FIG. 4 demonstrates that in a laboratory setting this can be achieved in two ways: 1) supply a solid silica source that will produce that concentration upon dissolution (Amorphous silica, Colloidal silica, Diatoms, and Silica Sponge); or 2) supply a solution containing silica in solution at a concentration at or above amorphous saturation.

Microquartz Formation Algorithm Prediction for Burial Rate Example

In this example, we use certain assumptions about the geologic setting to test whether burial rate affects microquartz formation. The following describes creation of a model of sedimentary rock. This rock includes two components: quartz grains and biogenic silica grains (e.g., sponge spicules). Specifying this as a coarse-grained sandstone, the size of the quartz grains are set at 1 mm diameter, a value of $\varphi=0.0$ on the Krumbein scale. Due to their fragility, the co-deposited biogenic silica particles are assumed smaller, a diameter of 0.05 mm, $\varphi=5$. Assuming a sub-aqueous deposition, these grains form a rock with a porosity of 0.4, having completely water filled pore space surrounding the grains. Our model rock is predominately quartz (95%), the remaining solid (5%) biogenic silica. This is by volume, but due to their similar values of density, respectively 2.65 and 2.5 g/cc, the weight fraction is similar. For the purpose of illustration, the grains are assumed to be spherical and from this assumption the respective surface areas are calculated. The surface areas will influence the kinetics.

Representative values for the kinetic factors can be obtained from the literature too. For quartz, the rate constant, k+, was selected from Rimsdit and Barnes (1980) (which can be multiplied by a corrective factor discussed below). For biogenic silica, the kB value from Schink et al. (1974) was selected, where k+=kB/A. A is the surface area. These rates were modified in a manner similar to the modification used for quartz rates when applied to reservoir models, i.e. Lander and Walderhaug (1999). For quartz, it is well known to those of ordinary skill in the art that the experimental values are 5 orders of magnitude too fast for use in describing field-observed rates. This difference is also applied to amorphous silica. Therefore, a fixed multiplier of $10^{-5}$ is applied to the experimental rates for that material. The equilibrium concentrations, K, were calculated according to the functions supplied by (Rimsdit and Barnes, 1980). The kinetics obtained here can be suitable for most basins. These values are merely examples and are not limiting. Other values could be derived and utilized with the present model.

The following is a non-limiting numerical example for the surface area and kinetic factors. Assume 0.6 volume fraction solid (40% porosity) and a total volume of $10^{-3}$ m$^3$. Further, assume that only 0.05 volume fraction is amorphous silica the rest quartz. Spherical particles are assumed, smaller for the amorphous phase, d=0.05 mm, and larger for the quartz, d=1 mm. Using the respective densities of 2.5 g/cc and 2.65 g/cc, the surface areas are $4.8\times10^{-2}$ and $2.3\times10^{-3}$ m$^2$/gm. The surface area is calculated relative to a fixed volume of rock, $10^{-3}$ m$^3$ (one liter). In that volume, the mass of amorphous silica is 75 gm and the mass of quartz is 1511 gm. Therefore, the respective surface areas are 3.6 and 3.5 m$^2$. The kinetic factors are obtained from the literature; quartz (Rimsdit and Barnes, 1980), and amorphous silica (Schnik et al., 1975). As noted above, a corrective factor of $10^{-5}$ is applied to the experimental rates for these materials. This corrective factor from field studies is documented by (Lander and Walderhaug, 1999) and used here. The resulting equations are:

$$k_{amorphous}^+ = 10^{-5} 10^{1 \times 10^{-9}/A} \quad (8)$$

$$k_{quartz}^+ = 10^{-5} 10^{1.174 - 0.002028T - 4158/T}, \quad (9)$$

where A is the surface area for the amorphous silica in m² and T is the temperature in Kelvin. These kinetic constants are given in units of mol $SiO_2/m^2$ s.

The equilibrium concentrations, K, are calculated according to the functions supplied by (Rimstidt and Barnes, 1980) as follows:

$$\text{Log } K^{amorphous} = 0.338 - 0.0007889 \cdot T - (840.1/T), \quad (10)$$

$$\text{Log } K^{quartz} = 1.881 - 0.002028 \cdot T - (1560/T). \quad (12)$$

Theses quantities were inserted into the equation for C(t) (equation 5), using time steps appropriately short to be considered isothermal at each time step for the kinetics considered here.

As burial rate and geothermal gradient varies from basin to basin, the rate of temperature rise upon burial will also vary. Hence, to illustrate an exemplary utility of this algorithm, burial rate is examined as a factor in determining whether conditions favoring microquartz formation will prevail. The characterization of burial rate as fast or slow is dependent upon whether microquartz is formed.

Figure 5A:
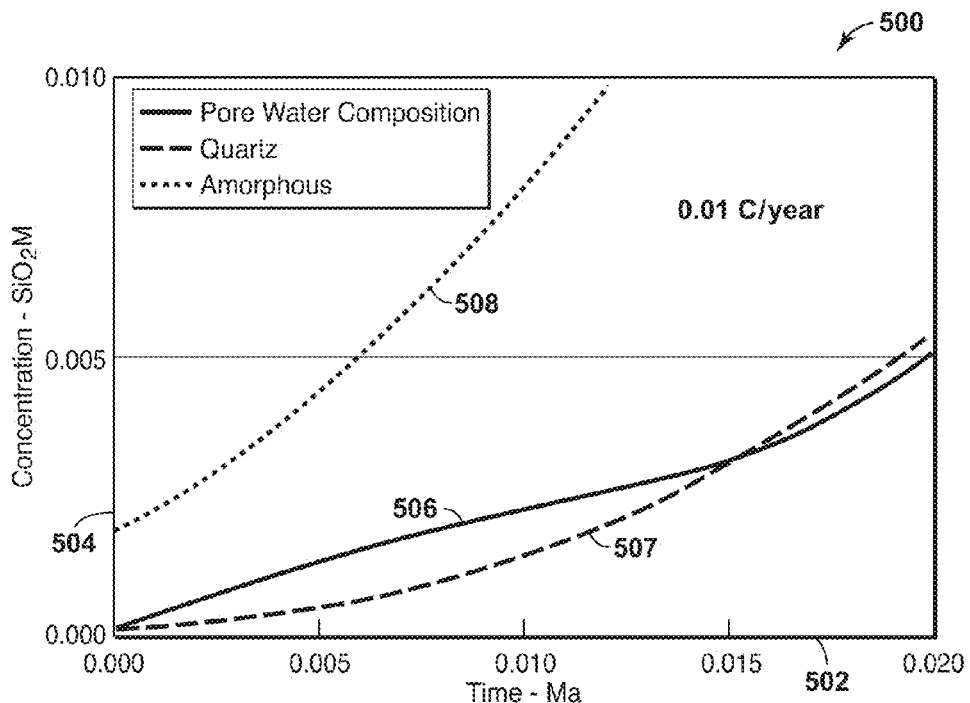
FIG. 5A illustrates silica concentration vs. time for a fast burial rate.

The results of the model for fast burial are shown in graph 500 of FIG. 5A. The indicated burial rate is for illustration only. Details of the exact burial rate will of course depend on factors such as proportion of biogenic silica to quartz and relative grain size. The burial rate information can be derived from the geologic setting (e.g., a basin model prepared a priori) and is obtainable from the literature.

In the graph 500, various responses 506, 507 and 508 are shown for concentration (SIO2M) along axis 504 for different time, Ma (million years) along axis 502. The responses include the pore water composition response 506, the quartz response 507 and the amorphous response 508. The model for fast burial (FIG. 5A) illustrates the essential feature that under the right conditions, the concentration of silica in the pore water (C(t), i.e., line 506) approaches the quartz saturation value (line 507). These are conditions for quartz growth.

Figure 5B:
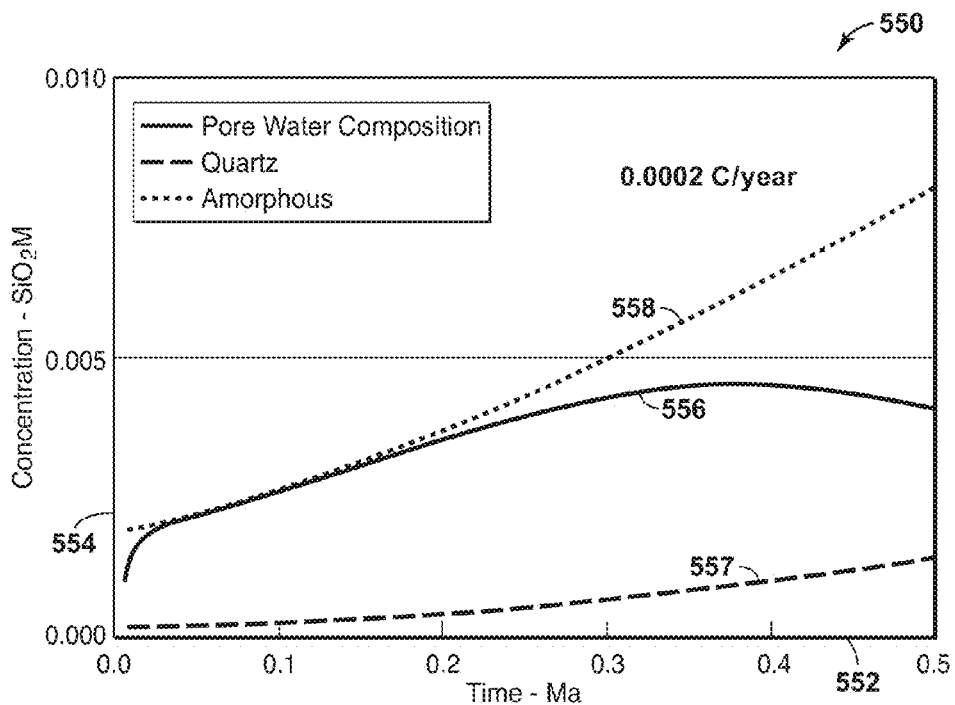
FIG. 5B illustrates silica concentration vs. time for a slow burial rate.

In contrast, the model for slow burial rate predicts favorable microquartz formation. In the graph 550, various responses 556, 557 and 558 are shown for concentration (SIO2M) along axis 554 for different time, Ma (million years) along axis 552. The responses include the pore water composition response 556, the quartz response 557 and the amorphous response 558. FIG. 5B shows that C(t) (line 556) remains near to the calculated amorphous silica saturation (line 558). For this illustration, the present model rock is subjected to a 50 times slower burial rate and this model gives results in FIG. 5B that shows an early, low-temperature rise in silica concentration. The concentration remains close to the amorphous saturation line and will thus favor microquartz formation. This scenario is one that the present algorithm predicts would have high RQ.

The present technological advancement can predict that changing burial rate will create a scenario for high RQ. To utilize this information, an exemplary a method can include analyzing a basin that has undergone different thermal histories, and selecting for exploration those with slower burial rates. Many scenarios run with slight differences in model rock characteristics can provide a probability estimate to be used in risk assessment.

Amount of Amorphous Silica for Microquartz Formation

A very small fraction of amorphous silica is sufficient to form microquartz coatings. Using the model rock from the above example, the amount of amorphous (e.g. biogenic silica) required to create a 5 µm thick coating on the 1 mm diameter quartz grains can be calculated. When the amorphous silica goes into solution to create the coating, some $SiO_2$ remains solubilized. That quantity is temperature dependent; therefore, the calculation includes a small temperature dependence. Table 1 summarizes the results, with the first two columns indicating the temperature and equilibrium concentration of silica in water. These values could change slightly if the pH or salt content of the water were to change. The next table entry indicates the amount of silica present in the pore water of an assumed 1 liter volume of rock with a porosity of 0.4. The model rock consists of spherical grains of 1 mm in diameter and the amount of silica consumed in coating them with a 5 µm coating is given in the fourth column. Finally, the last two columns show the volume and weight fraction of amorphous silica relative to quartz.

Table 1 shows an estimate of minimum required amorphous silica (e.g. biogenic silica) to create microquartz coat for the model rock.

TABLE 1

| T, C | Amorphous $SiO_2$ solubility (ppm) | $SiO_2$ in pore fluid (gm) | $SiO_2$ in 5 um grain coat (gm) | Minimum Amorphous $SiO_2$ Volume % | Minimum Amorphous $SiO_2$ Weight % |
|---|---|---|---|---|---|
| 25 | 115.5 | 0.046 | 0.000045 | 0.003 | 0.003 |
| 50 | 182.4 | 0.073 | 0.000045 | 0.005 | 0.005 |
| 75 | 268.0 | 0.107 | 0.000045 | 0.007 | 0.007 |
| 100 | 594.6 | 0.238 | 0.000045 | 0.016 | 0.015 |

Because the mass of required silica is dominated by the amount in solution, a very small fraction of amorphous silica is sufficient to form microquartz over wide variations in grain sizes. The amount of amorphous silica required is so small that it might be difficult to detect if present. This observation offers a distinct advantage to the use of the present algorithm. It is likely that many rocks will meet the minimum concentration requirements and no special effort is needed to locate regions where amorphous silica may be highly concentrated in the sediments. Thus, the algorithm can be widely applicable.

Exemplary Methods

Figure 6:
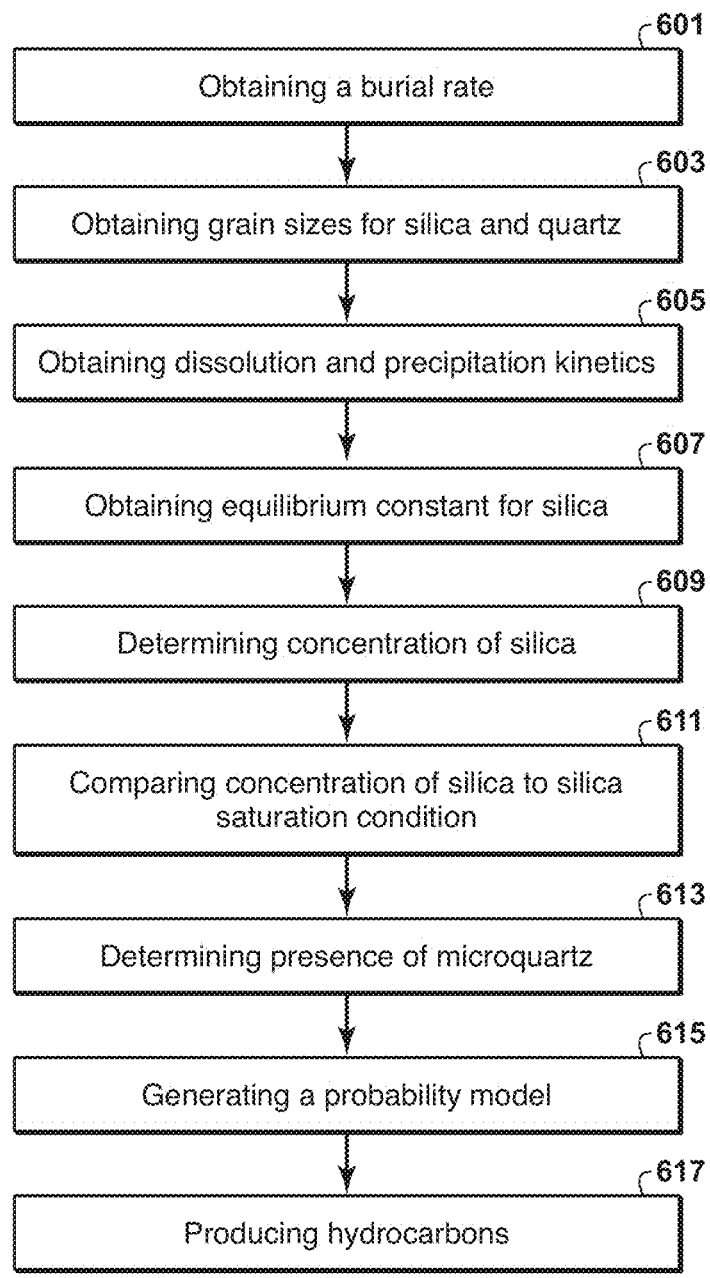
FIG. 6 illustrates an exemplary method.

FIG. 6 illustrates a flow chart of an exemplary method. This exemplary method utilizes the model described above, and further expands on the generation of a probability model and the use of the model in the production of hydrocarbons. The present model can be utilized without performing all of the steps, and the steps do not necessarily have to be executed in the recited order.

Step 601 includes obtaining a burial rate for at least a portion of a basin. The burial rate can be obtained from the geologic setting, and can provide a heat flow model. The geologic setting can provide time-temperature relationship for the basin, which can impact the kinetics utilized in the present model.

Step 603 includes obtaining a grain size for amorphous silica associated with a basin and a grain size for quartz associated with the basin. The grain sizes may vary across different zones of the basin. Distance from the shore is known to influence grain size. Furthermore, the geologic setting may provide various grain sizes for the zones of the basin, wherein each grain size is provided with a probability that it is present within any given zone. Furthermore, grain sizes may be obtained from other basins considered to have a similar geologic history and/or setting as the basin under investigation.

Step 605 includes obtaining kinetics of silica dissolution corresponding to the basin and quartz precipitation corresponding to the basin. As discussed supra, the kinetics can be derived from information provided in the cited literature. Those values in the cited literature are suitable for use in the present model independent of the silica source. However, a person of ordinary skill in the art could also further investigate surrounding regions that may have a similar geologic setting (and similar kinetics) or conduct analyses without undue experimentation to refine, generate, or obtain the kinetics.

Step 607 includes obtaining an equilibrium constant for the silica. The equilibrium constant (K, supra) can also be derived from the geologic setting or obtained from the literature, or may be obtained through known analyses without undue experimentation to refine, generate, or obtain the equilibrium constant.

Step 609 includes determining a concentration of amorphous silica in water based on the grain size for amorphous silica, the grain size for quartz, the equilibrium constant and the kinetics of silica dissolution and quartz precipitation. This relationship is established in equation 5, supra.

Step 611 includes comparing the concentration of amorphous silica in water to an amorphous silica saturation condition. An example of such a comparison is shown FIGS. 5A and 5B. However, the generation of such plots is not necessarily required, and this step, as other steps in the method, can be implemented with machines and/or specifically programmed computers.

Step 613 includes determining a presence of microquartz when the concentration of amorphous silica is at or above 0.5 times the amorphous silica saturation conditions. However, the threshold of 0.5 may be set at any value from 0.5 and upwards. A person of ordinary skill could select an appropriate threshold based on a balance of risk/reward in determining whether to assess zones of the basin as having high reservoir quality (i.e., the lower the threshold the more zones are going to be classified as having high RQ, with some having a higher probability of being inaccurate).

Step 615 pertains to the creation of a probability model for the basin. Steps 601-613 may be repeated n times (n≥0) to generate the probability model for the basin. In each iteration, one or more variables (grain size, silica source, and/or burial rate, for example) can be varied, with each values for the variable(s) having an associated probability. This associated probability is used to assign a probability to the corresponding determination of the presence of microquartz in a particular zone of the basin under the particular conditions. The probability used here is can be expressed on an absolute scale (i.e., a expressed with a value of 0%-100%) or can be a relative likelihood (i.e., different zones of the basin are ranked in order of likelihood of having high reservoir quality). Such probability models may be useful in analyzing the basin in order to determine the best locations to begin hydrocarbon production (step 617).

Figure 7:
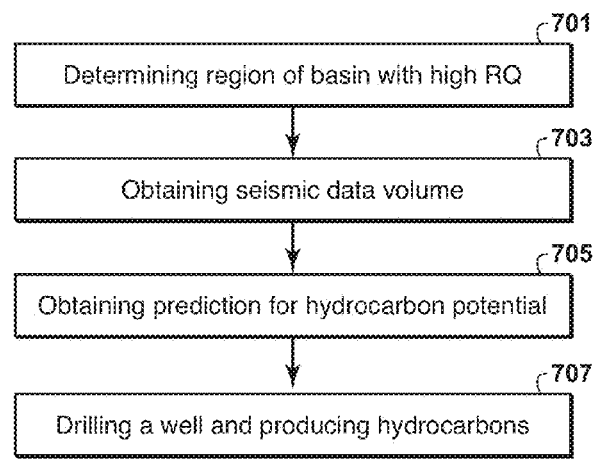
FIG. 7 illustrates an example of the hydrocarbon production referenced in FIG. 6.

Step 617 may be broken out into a series of steps shown in FIG. 7 Step 701 includes determining a region of a basin with high reservoir quality using the method shown in FIG. 6. Step 703 includes obtaining a seismic data volume representing a subsurface region of a zone of the basin determined to include microquartz. Step 705 includes obtaining prediction of the potential for hydrocarbon accumulations in the subsurface. Step 707 includes, in response to a positive prediction of hydrocarbon potential, drilling a well into the subsurface region and producing hydrocarbons. A positive prediction is determined relative to predetermined threshold, which a person of ordinary skill in the art can establish based on how they manage risk/reward/cost for a particular exploration.

System

Figure 8:
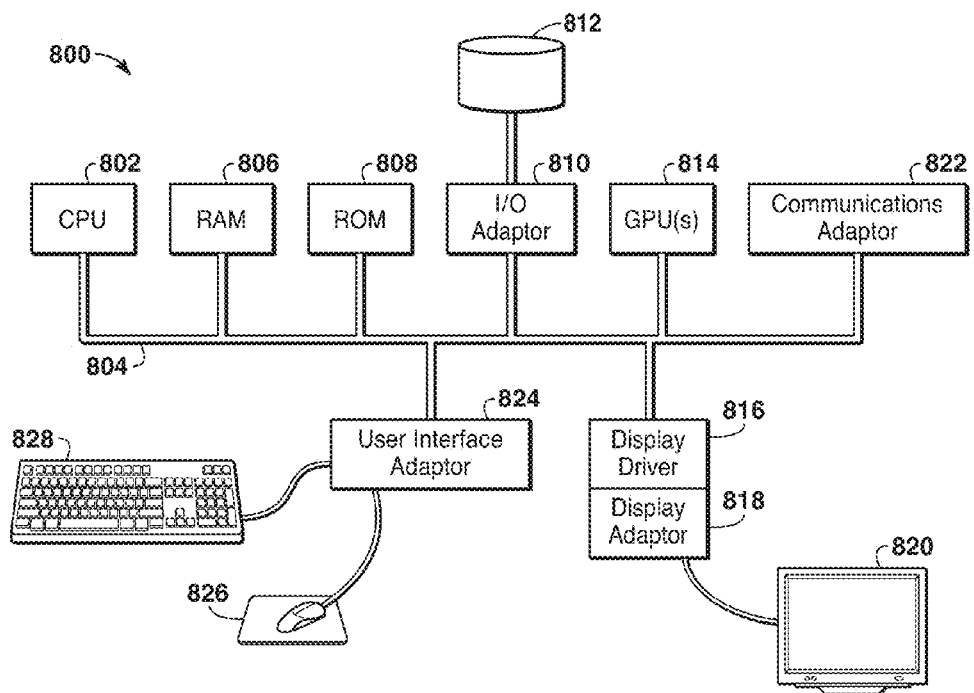
FIG. 8 illustrates an exemplary computer system upon which the present method can be implemented.

FIG. 8 is a block diagram of a computer system 800 that can be used to execute an the present techniques. A central processing unit (CPU) 802 is coupled to system bus 804. The CPU 802 may be any general-purpose CPU, although other types of architectures of CPU 802 (or other components of exemplary system 800) may be used as long as CPU 802 (and other components of system 800) supports the operations as described herein. Those of ordinary skill in the art will appreciate that, while only a single CPU 802 is shown in FIG. 8, additional CPUs may be present. Moreover, the computer system 800 may comprise a networked, multi-processor computer system that may include a hybrid parallel CPU/GPU system. The CPU 802 may execute the various logical instructions according to various teachings disclosed herein. For example, the CPU 802 may execute machine-level instructions for performing processing according to the operational flow described.

The computer system 800 may also include computer components such as non-transitory, computer-readable media. Examples of computer-readable media include a random access memory (RAM) 806, which may be SRAM, DRAM. SDRAM, or the like. The computer system 800 may also include additional non-transitory, computer-readable media such as a read-only memory (ROM) 808, which may be PROM, EPROM, EEPROM, or the like. RAM 806 and ROM 808 hold user and system data and programs, as is known in the art. The computer system 800 may also include an input/output (I/O) adapter 810, a communications adapter 822, a user interface adapter 824, and a display adapter 818.

The I/O adapter 810 may connect additional non-transitory, computer-readable media such as a storage device(s) 812, including, for example, a hard drive, a compact disc (CD) drive, a floppy disk drive, a tape drive, and the like to computer system 800. The storage device(s) may be used when RAM 806 is insufficient for the memory requirements associated with storing data for operations of the present techniques. The data storage of the computer system 800 may be used for storing information and/or other data used or generated as disclosed herein. For example, storage device(s) 812 may be used to store configuration information or additional plug-ins in accordance with the present techniques. Further, user interface adapter 824 couples user input devices, such as a keyboard 828, a pointing device 826 and/or output devices to the computer system 800. The display adapter 818 is driven by the CPU 802 to control the display on a display device 820 to, for example, present information to the user regarding available plug-ins.

The architecture of system 800 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" includes a hardware processor (such as those found in the hardware devices noted above), ASICs, and VLSI circuits. Input data to the computer system 800 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following references are hereby incorporated by reference in their entirety:

Aase, N. E., Bjorkum, P. A. and Nadeau, P. H., 1996. The effect of Grain-Coating Microquartz on Preservation of Reservoir Porosity. AAPG Bulletin, 80: 1654-1673;

Haddad, S. C., Worden, R. H., Prior, D. J. and Smalley, P. C., 2006. Quartz cement in the Fontainebleau sandstone, Paris basin, France: Crystallography and implications for mechanisms of cement growth. Journal of Sedimentary Research, 76: 244-256;

Lander, R. H. and Walderhaug, O., 1999. Predicting Porosity through Simulating Sandstone Compaction and Quartz Cementation. AAPG Bulletin, 83: 433-449;

Lynne, B. Y., Campbel, K. A., Moore, J. N. and Browne, P. R. L., 2005. Diagenesis of 1900-year-old siliceous sinter (Opal-A to quartz) at Opal Mound, Roosevelt Hot Springs, Utah, U.S.A. Sedimentary Geology, 179: 249-278;

Rimstidt, J. D. and Barnes, H. L., 1980. The kinetics of silica-water reactions. Geochimica et Cosmpochimica Acta, 44: 1683-1699;

Schnik, D. R., Guinasso, N. L., Jr., and Fanning, K. A., 1975, Process Affecting the Concentration of Silica at the Sediment-Water Interface of the Atlantic Ocean. Journal of Geophysical Research 80(21): 3013-3031; and Worden, R. H., French, M. W. and Mariani, E., 2012. Amorphous silica nanofilms result in growth of misoriented microcrystalline quartz cement maintaining porosity in deeply buried sandstones. Geology, 40(2): 179-182.

What is claimed is:

1. A method, comprising:
   obtaining a grain size for amorphous silica associated with a basin and a grain size for quartz associated with the basin;
   obtaining kinetics of silica dissolution corresponding to the basin and quartz precipitation corresponding to the basin;
   determining, with a processor, a concentration of amorphous silica in water based on the grain size for amorphous silica, the grain size for quartz, and the kinetics of silica dissolution and quartz precipitation;
   comparing, with the processor, the concentration of amorphous silica in water to an amorphous silica saturation condition;
   determining, with the processor, a presence of microquartz based on a result of the comparing; and
   generating a model for the basin, where the model assigns a probability of the presence of microquartz in a particular zone of the basin based on the determined presence of microquartz.

2. The method of claim 1, further comprising:
   obtaining a burial rate for at least a portion of the basin, the burial rate providing a heat flow model, wherein the kinetics are dependent on temperature from the heat flow model.

3. The method of claim 2, wherein the grain size for amorphous silica, the grain size for quartz, the kinetics of silica dissolution and quartz precipitation, and the burial rate are derived from a geologic setting of the basin.

4. The method of claim 1, wherein:
   the comparing includes determining a difference between the concentration of amorphous silica in water and amorphous silica saturation condition, and
   the determining the presence of microquartz includes comparing the difference to a predetermined threshold.

5. The method of claim 1, wherein the presence of microquartz is determined in response to the difference being above the predetermined threshold.

6. The method of claim 4, wherein the predetermined threshold is at or above 0.5 times the amorphous silica saturation condition.

7. The method of claim 1, further comprising:
   obtaining an equilibrium constant for the amorphous silica in water, wherein:
   the equilibrium constant for the amorphous silica in water is additionally used in determining the concentration of amorphous silica in water.

8. The method of claim 1, wherein the amorphous silica is biogenic silica.

9. The method for claim 1, further comprising:
   obtaining a plurality of grain sizes for amorphous silica, each of the plurality of grain sizes being associated with a probability of occurring in the basin; and
   determining a probability of a presence of microquartz corresponding to each of the plurality of grain sizes.

10. The method for claim 1, further comprising:
    obtaining a plurality of burial rates, each of the burial rates being associated with a probability of occurring in the basin; and
    determining a probability of a presence of microquartz corresponding to each of the plurality of burial rates.

11. The method of claim 1, further comprising:
    obtaining identification of a plurality of silica sources, each of the plurality of silica sources being associated with a probability of occurring in the basin; and
    determining a probability of a presence of microquartz corresponding to each of the plurality of silica sources.

12. The method of claim 11, wherein the plurality of silica sources includes amorphous silica sources of colloidal silica, diatoms, or silica sponge.

13. The method of claim 1, further comprising:
    obtaining a seismic data volume representing a subsurface region of a zone of the basin determined to include microquartz;
    obtaining a prediction of the potential for hydrocarbon accumulations in the subsurface; and
    in response to a positive prediction of hydrocarbon potential, drilling a well into the subsurface region corresponding to the zone of the basin determined to comprise microquartz, and producing hydrocarbons.

14. A method, comprising:
    obtaining a grain size for silica associated with a basin and a grain size for quartz associated with the basin;
    obtaining kinetics of silica dissolution corresponding to the basin and quartz precipitation corresponding to the basin;

determining, with a processor, a concentration of silica in water based on the grain size for silica, the grain size for quartz, and kinetics of silica dissolution and quartz precipitation;

determining, with the processor, a presence of microquartz based on the concentration of silica in water; and identifying zones in the basin having high reservoir quality based on the presence of microquartz.

15. A method, comprising:

obtaining, for a basin with zones that have each undergone a different thermal history, a corresponding plurality of burial rates;

determining, with a processor, a relative likelihood that each of the zones includes microquartz based on the corresponding plurality of burial rates;

determining a reservoir quality potential of one or more zones of the basin; and updating a basin model with the reservoir quality potential for the one or more zones.

16. The method of claim 1, further comprising determining a potential for hydrocarbon accumulations in one or more zones of the basin based on the probability of the presence of microquartz.

17. The method of claim 16, further comprising causing a well to be drilled in the zone of the basin with the highest potential for hydrocarbon accumulation.

* * * * *